United States Patent [19]
Alles

[11] Patent Number: 5,083,985
[45] Date of Patent: Jan. 28, 1992

[54] CONNECTION FOR CONVEYOR BELTS OR POWER TRANSMISSION BELTS

[75] Inventor: Rainer Alles, Isernhagen, Fed. Rep. of Germany

[73] Assignee: Continental Aktiengesellschaft, Hannover, Fed. Rep. of Germany

[21] Appl. No.: 656,299

[22] Filed: Feb. 15, 1991

[30] Foreign Application Priority Data

Feb. 16, 1990 [DE] Fed. Rep. of Germany ....... 4004784

[51] Int. Cl.⁵ .............................................. F16G 1/00
[52] U.S. Cl. .................................... 474/253; 474/254
[58] Field of Search ................................ 474/253–256, 474/258; 24/31 B, 31 W

[56] References Cited

U.S. PATENT DOCUMENTS

| | | | |
|---|---|---|---|
| 2,955,065 | 10/1960 | Paul | 474/254 X |
| 3,783,704 | 1/1974 | Lawson | 474/253 X |
| 4,034,617 | 7/1977 | Guyer | 474/254 X |

FOREIGN PATENT DOCUMENTS

2511671 9/1976 Fed. Rep. of Germany .

Primary Examiner—Thuy M. Bui
Attorney, Agent, or Firm—Robert W. Becker & Associates

[57] ABSTRACT

A connection for two end portions of a conveyor belt or a power transmission belt of elastomeric material having a load-carrying member that is made of metal or woven material and is embedded between cover layers is provided. The free ends of the load-carrying member are placed together in a connection location that is covered by a reinforcement layer, which is embedded in elastomeric material, whereby in zones of the free ends of the load-carrying member, the reinforcement layer is interrupted.

5 Claims, 2 Drawing Sheets

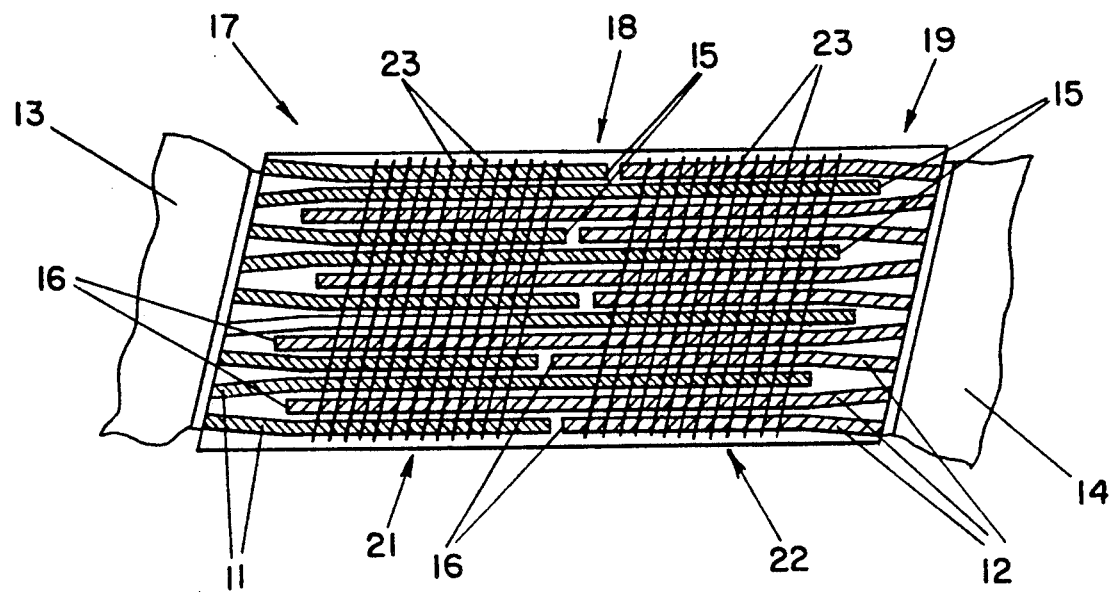
FIG—1
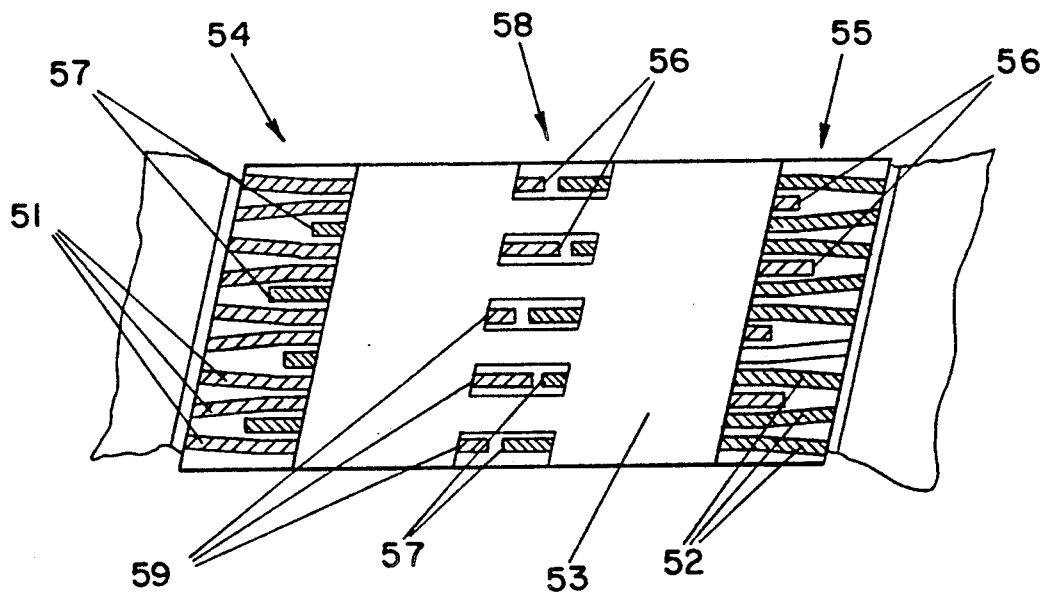
FIG—4

CONNECTION FOR CONVEYOR BELTS OR POWER TRANSMISSION BELTS

BACKGROUND OF THE INVENTION

The present invention relates to a connection for two end portions of a conveyor belt or a power transmission belt of elastomeric material having a load-carrying member that is made of metal or woven material and is embedded between cover layers. The free ends of the load-carrying member are placed together in a connection location that is covered by a reinforcement that is embedded in elastomeric material and comprises a woven cover, or threads or wires that are oriented transverse or essentially transverse to the load-carrying members.

The task of the load-carrying member that is embedded in the conveyor belt or the power transmission belt is to transmit the forces that are introduced at the drive mechanisms. In a fabric-reinforced belt, the load-carrying means comprises one or more superimposed woven layers. Where the belt comprises steel cables, the load-carrying member is formed of steel cables or wires that are disposed in a plane, extend parallel to one another in the longitudinal direction of the belt, and are embedded in core rubber. In place of steel cables or wires, the load-carrying member can also comprise other filament-like strength carriers.

To close an open belt and make it continuous, and to join together several partial lengths, in most cases connections are established by vulcanization, whereby the belt tension forces are transmitted from one strength carrier to the other via shearing stresses in the rubber. The free ends of the load-carrying member are placed together in the connection location. In this connection, individual layers or cables of the load-carrying member can abut one another or can be disposed freely over or between the load-carrying member of the other belt end in an overlapping or intermeshing arrangement. In each case, the ends of the load-carrying member are freely embedded in the surrounding elastomeric material.

In the connection location, the tension forces of one load-carrying member are transmitted to the other load-carrying member through the rubber layers that are disposed therebetween. The forces are present in the form of a shearing stress.

With wire cable conveyor belts, the transfer of force from the cable of one belt end to the cable of the other belt end is effected via the rubber layer that is disposed therebetween and that must have at least a certain minimum thickness.

To transmit greater tension stresses, high strength conveyor belts are used, the connection location of which has a multi-stage configuration.

To protect the conveyor belt from damage or destruction, the conveyor belts are provided with an insert that is generally inserted between the band core and the upper and/or lower cover layer and that acts as a protection against cuts and penetrations. This insert is in the form of a reinforcing insert that comprises steel cables or similar filament-like structures, and that extends linearly and at an angle or transverse to the longitudinal direction of the conveyor belt and over the entire width of the belt, with the exception of narrow edge zones. This protective transverse reinforcement must also pass through the connection location of the conveyor belt.

It is also known to provide a transverse reinforcement just in the connection location of a belt that is otherwise not transversely reinforced. In so doing, the transverse reinforcement serves to increase the resistance to shearing in the connection location.

DE-PS 25 11 671 discloses a connection of the abutting end portions of a conveyor belt or power transmission belt that is made of rubber or rubber-like synthetic materials; in this connection, a transverse reinforcement is provided that comprises a reinforcement insert made up of spaced-apart parallel threads or wires that extend transverse or essentially transverse to the load-carrying member. In the central portion of the connection, the transversely disposed chord filaments have the narrowest spacing, which becomes increasingly greater in both directions toward the end regions. The entire length of the connection is covered with this transverse reinforcement.

To establish connections of steel cable conveyor belts, DIN (German industrial standard) 22129, section 4, prescribes that a transverse reinforcement in the carrying side should also be introduced in the region of the connection if the transverse reinforcement extends over the entire length of the conveyor belt. However, from the transition zones, in which the covers are inclined relative to the core of the belt, a small gap of approximately 50 mm must be maintained for the convenience of the worker.

Obviously, the weakest spot of a conveyor belt is its connection. The fatigue strength of the belt is limited by the dynamic durability of the connection.

It has been discovered that the disintegration of the connection begins at the free ends of the two load-carrying member ends. With a wire cable conveyor belt, this disintegration can result in a working-out of the ends of the wire cables. Thus, the elastomeric material at the free ends of the load-carrying member proves to be the weakest point of the connection, even if the force that is to be transmitted at that location is very small in comparison to the individual tension stresses in the load-carrying member. This is attributed to the fact that at the free ends in the elastomeric material shearing stresses result that are proportional to the tension stresses. The high shearing stress of the elastomeric material at the free ends is the cause for the start of a possible belt disintegration at that location.

In order to reduce the shearing in the connection and to increase the dynamic strength, it is known to increase the gaps between the load-carrying members via special arrangement patterns. Transverse reinforcements also contribute to the reduction because they increase the resistance to shearing. However, there is still a requirement for a further increase of the dynamic strength of the connection.

It is therefore an object of the present invention to increase the dynamic strength of the connection of conveyor belts or power transmission belts.

BRIEF DESCRIPTION OF THE DRAWINGS

This object, and other objects and advantages of the present invention, will appear more clearly from the following specification in conjunction with the accompanying schematic drawings, which illustrate three exemplary embodiments of the present invention, and in which:

FIG. 1 shows a two-stage connection of a wire cable conveyor belt;

FIG. 4 shows a two-stage connection of a wire cable conveyor belt having a woven cover as a reinforcing insert.

SUMMARY OF THE INVENTION

Figure 2:
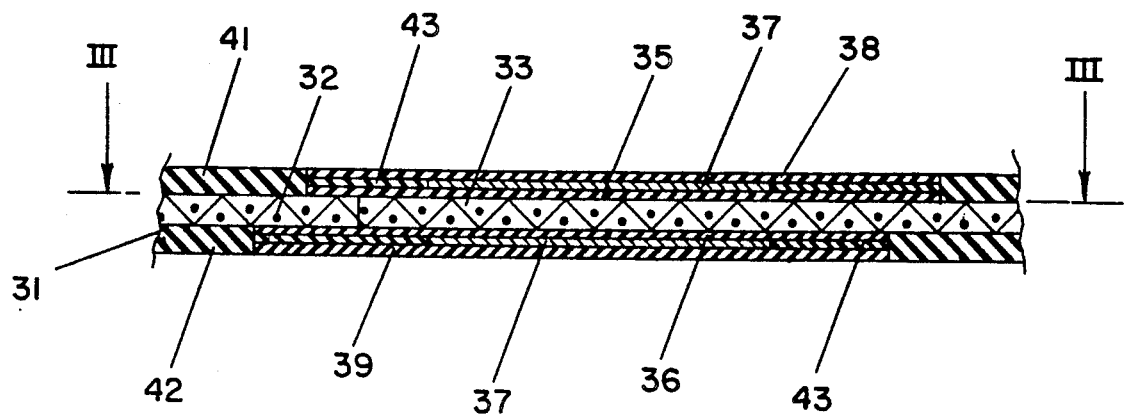
FIG. 2 is a longitudinal cross sectional side view of a finger splice connection of a textile conveyor belt.

The connection of the present invention is characterized primarily in that in zones of the free ends of the load-carrying members, the reinforcement means are interrupted.

As indicated, the reinforcement means are interrupted at the load-carrying members where they freely end in the connection location. The surprising result of this measure is that the dynamic strength of the connection is significantly increased. A working-out of the free ends of the load-carrying member was further minimized. This advantageous effect is attributed to the fact that the likelihood of occurrence of failures at the free ends of the load-carrying members that are to be connected is reduced because a larger volume of rubber is available for the shearing deformations. Due to this larger volume of rubber, the shearing is less at the load-carrier member ends, which represent the critical spots of a belt connection.

The volume of the covers is available at the free ends, so that the shearing deformations that occur can be dispersed in the rubber. Due to the smaller shearing angle that is obtained, stress peaks are avoided in the region of the free ends.

Pursuant to one advantageous specific embodiment of the present invention, the interrupted portion of the reinforcement means extends over the entire width of the belt. With such an arrangement, the connection can be established in a very straightforward manner.

Pursuant to a further advantageous specific embodiment of the present invention, the reinforcement means, in the region of the free ends of the load-carrying member, is provided with window-like interruptions. This arrangement is advantageous for reinforcement means in the connection region made of a woven layer.

The reinforcement means can comprise woven or metallic cords that are disposed essentially transverse to the load-carrying member. The reinforcement means can also comprise a woven layer.

With the present invention, the dynamic durability of a conveyor belt or a power transmission belt is increased while maintaining tensile strength.

Further specific features of the present invention will be described in detail subsequently.

DESCRIPTION OF PREFERRED EMBODIMENTS

Referring now to the drawings in detail, in the connection illustrated in FIG. 1, the wire cables 11 and 12 of two conveyor belt ends 13 and 14 intermesh in a step-like manner. After each pair of adjacent cables 11 and 12 that pass through the connection from the left and right belt ends 13 and 14, the next corresponding pair of cables is cut off in such a way that the cables thereof essentially abut one another in the center of the connection. In the illustrated connection, the free ends 15, 16 of the cables 11, 12 are disposed in three distinct zones 17, 18 and 19 that are disposed transverse to the belt width.

In the connection, between the zones 17, 18 and 19 of the free ends 15, 16 of the wire cables 11, 12, transverse reinforcements 21 and 22 of filaments 23 are introduced that transverse to the wire cables 11 and 12 are vulcanized into the non-illustrated upper connection cover. The filaments 23 can be in the form of single filaments or cords. The filaments 23 ca also be made of metallic material. The 17 18 and 19 of the free ends 15, 16 are not covered by the transverse reinforcements 21 and 22.

Figure 3:
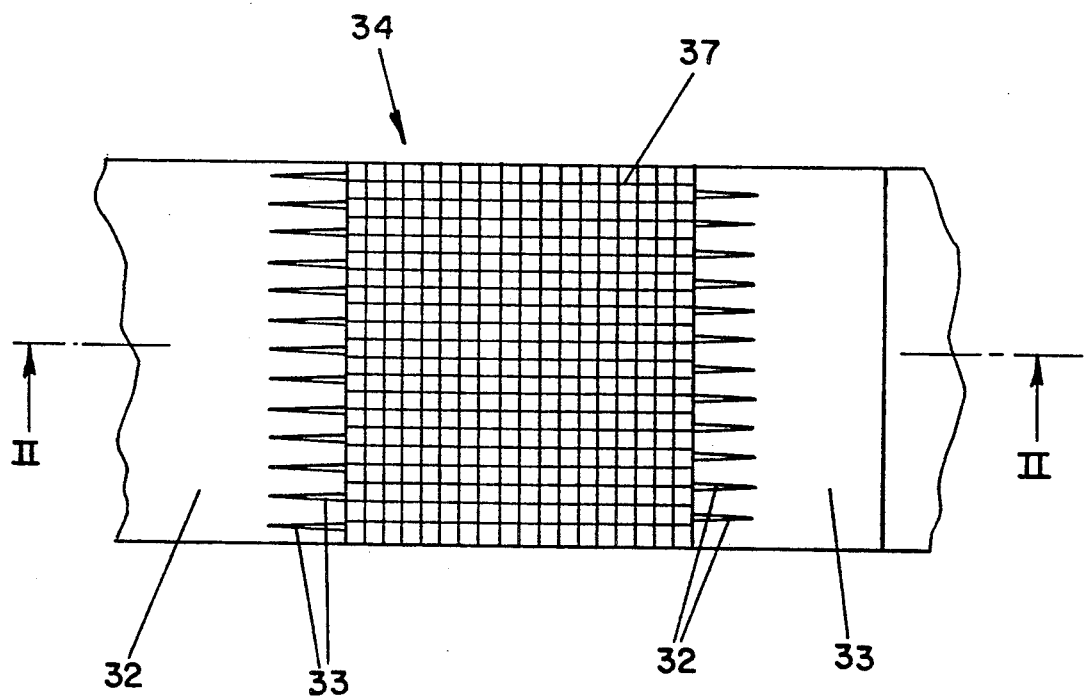
FIG. 3 is a plan view of the conveyor belt of FIG. 2, with the outer rubber cover layer having been left off.

The woven or textile conveyor belt shown in FIGS. 2 and 3 has a load-carrying member that is made of woven fabric 31. The free ends 32 and 33 of the two ends of the load-carrying member that are to be connected are cut to length in a corresponding pointed manner, and intermesh in a finger splice connection 34.

Each side of the connection location is covered by a respective thin inner rubber layer 35, 36. Provided on each of these inner rubber layers 35, 36 is a respective transverse reinforcement in the form of an applied woven layer 37, for example a woven grid or wire mesh. The woven layers 37, which are disposed on both sides, are covered toward the outside by rubber layers 38 and 39, which are of such a height that their outer surfaces are flush with the outer surfaces of the covers 41 and 42 of the conveyor belt.

The transversely reinforcing woven layers 37 extend between the pointed ends 32, 33 of the load-carrying member 31, and do not cover the two zones of the free ends 32, 33 of the load-carrying member 31. Disposed in the connection and laterally adjoining the woven layers 37 are rubber compensating strips 43.

The embodiment of a connection of a steel cable conveyor belt illustrated in FIG. 4 is provided with a woven layer 53 that is disposed over the steel cables or wires 51 and 52, and is embedded in core rubber; this woven layer does not cover the left and right zones 54 and 55 of the free ends 56, 57 of the steel cables or wires 51, 52. In the middle zone 58 of the connection, some of the wire cable ends 56, 57 essentially abut one another, with the necessary spacing being provided therebetween. In this zone where the ends abut one another, the woven layer 53 is provided with window-like cutouts, so that these abutment areas 59 are also uncovered.

The present invention is, of course, in no way restricted to the specific disclosure of the specification and drawings, but also encompasses any modifications within the scope of the appended claims.

What I claim is:

1. A connection for two end portions of a conveyor belt or a power transmission belt of elastomeric material having a load-carrying member that is made of metal or woven material and is embedded between cover layers, wherein:
   free ends of said load-carrying means are placed together in a connection location that is covered by reinforcement means, which are embedded in elastomeric material, whereby in zones of said free ends of said load-carrying member, said reinforcement means are interrupted.

2. A connection according to claim 1, in which said interrupted zones of said reinforcement means extend over the entire width of said belt.

3. A connection according to claim 1, in which in at least one of said zones of said free ends of said load-carrying member said reinforcement means are provided with window-like interruptions.

4. A connection according to claim 1, in which said reinforcement means comprise woven or metal filaments that extend essentially transverse to said load-carrying member.

5. A connection according to claim 1, in which said reinforcement means comprises a woven layer.

* * * * *